United States Patent
Brendecke et al.

(10) Patent No.: US 10,166,883 B2
(45) Date of Patent: Jan. 1, 2019

(54) UNDERBODY OF AN ELECTRICALLY DRIVEN MOTOR VEHICLE

(71) Applicant: Dr. Ing. h.c. F. Porsche Aktiengesellschaft, Stuttgart (DE)

(72) Inventors: Felix Brendecke, Ditzingen-Hirschlanden (DE); Armin Steck, Kusterdingen (DE); Alexander Klausmann, Schönaich (DE); Harald Raiser, Balingen (DE); Maik-Uwe Zillich, Stuttgart (DE); Juergen Hofmann, Korntal-Muenchingen (DE); Thomas Fritz, Löchgau (DE); Matthias Herntier, Friolzheim (DE); Nicolas Schneider, Stuttgart (DE)

(73) Assignee: Dr. Ing. h.c F. Porsche Aktiengesellschaft, Stuttgart (DE)

(*) Notice: Subject to any disclaimer, the term of this patent is extended or adjusted under 35 U.S.C. 154(b) by 26 days.

(21) Appl. No.: 15/217,144

(22) Filed: Jul. 22, 2016

(65) Prior Publication Data
US 2017/0021740 A1 Jan. 26, 2017

(30) Foreign Application Priority Data
Jul. 24, 2015 (DE) .................... 10 2015 112 138

(51) Int. Cl.
*B60L 11/00* (2006.01)
*B60L 11/18* (2006.01)
(Continued)

(52) U.S. Cl.
CPC ............ *B60L 11/1877* (2013.01); *B60K 1/04* (2013.01); *B60L 11/1874* (2013.01);
(Continued)

(58) Field of Classification Search
CPC .... B60K 1/04; H01M 2/1077; H01M 2/1083; H01M 10/625; H01M 10/6568
See application file for complete search history.

(56) References Cited

U.S. PATENT DOCUMENTS 5,392,873 A * 2/1995 Masuyama .............. B60K 1/04
180/68.5
5,501,289 A * 3/1996 Nishikawa ............... B60K 1/04
180/65.1
(Continued)

FOREIGN PATENT DOCUMENTS

DE 102011010451 8/2012
DE 102011051698 1/2013
(Continued)

OTHER PUBLICATIONS

German Search Report for German Application No. 102015112138.7, dated Jun. 3, 2016.
(Continued)

*Primary Examiner* — Hau V Phan
(74) *Attorney, Agent, or Firm* — RatnerPrestia

(57) ABSTRACT

An underbody of an electrically driven motor vehicle, with a vehicle supporting structure, which is bounded laterally in a transverse direction of the vehicle by two vehicle sills between which a multiplicity of battery modules is arranged, which battery modules are assigned a battery supporting structure and at least one battery temperature control device, and with supply and removal devices for a temperature control medium. The supply and removal devices for the temperature control medium are arranged in the region of the vehicle sills.

8 Claims, 1 Drawing Sheet

(51) Int. Cl.
  *B60K 1/04* (2006.01)
  *H01M 2/10* (2006.01)
  *H01M 10/625* (2014.01)
  *H01M 10/6568* (2014.01)
  *H01M 10/6556* (2014.01)
  *H01M 10/613* (2014.01)
  *B60K 1/00* (2006.01)
  *B60K 11/02* (2006.01)

(52) U.S. Cl.
  CPC ....... *H01M 2/1077* (2013.01); *H01M 10/613* (2015.04); *H01M 10/625* (2015.04); *H01M 10/6556* (2015.04); *H01M 10/6568* (2015.04); *B60K 11/02* (2013.01); *B60K 2001/005* (2013.01); *B60K 2001/0438* (2013.01)

(56) References Cited

U.S. PATENT DOCUMENTS

| | | | |
|---|---|---|---|
| 6,085,854 A | 7/2000 | Nishikawa | |
| 6,188,574 B1* | 2/2001 | Anazawa | B60K 1/04 180/68.5 |
| 8,739,907 B2* | 6/2014 | Storc | B60K 1/04 180/65.29 |
| 8,936,125 B2* | 1/2015 | Nakamori | B60K 1/04 180/68.5 |
| 8,939,246 B2* | 1/2015 | Yamaguchi | B60K 1/04 180/311 |
| 9,061,712 B2 | 6/2015 | Patberg | |
| 9,281,547 B2* | 3/2016 | Maguire | H01M 10/625 |
| 9,614,207 B2* | 4/2017 | Wu | H01M 2/1077 |
| 2009/0023056 A1* | 1/2009 | Adams | B60L 11/1872 429/120 |
| 2011/0153140 A1* | 6/2011 | Datta | B60R 16/02 701/31.4 |
| 2013/0298586 A1* | 11/2013 | Hwang | B60K 1/04 62/239 |

FOREIGN PATENT DOCUMENTS

| | | |
|---|---|---|
| DE | 102012102657 | 10/2013 |
| DE | 102012109728 | 4/2014 |
| JP | H09109692 A | 4/1997 |

OTHER PUBLICATIONS

"A Guide to Understnading Battery Specifications," MIT Electric Vehicle Team, Dec. 2008.

English translation of the Chinese Office Action for Chinese Application No. 201610586007.5, dated Apr. 4, 2018, 3 pages.

* cited by examiner

UNDERBODY OF AN ELECTRICALLY DRIVEN MOTOR VEHICLE

CROSS-REFERENCE TO RELATED APPLICATIONS

This application claims priority to German Patent Application No. 10 2015 112 138.7, filed Jul. 24, 2015, which is incorporated by reference herein in its entirety.

FIELD OF INVENTION

The invention relates to the underbody of an electrically driven motor vehicle, with a vehicle supporting structure, which is bounded laterally in a transverse direction of the vehicle by two vehicle sills between which a multiplicity of battery modules is arranged, which battery modules are assigned a battery structure and at least one battery temperature control device, and with supply and/or removal devices for a temperature control medium.

BACKGROUND

German laid-open application DE 10 2011 010 451 A1, which is incorporated by reference herein, discloses a vehicle with at least one electrochemical energy storage unit, wherein the electrochemical energy storage unit is arranged in a central tunnel of an underbody structure and is coupled to a heat-conducting apparatus for the exchange of heat. German laid-open application DE 10 2012 102 657 A1, which is incorporated by reference herein, discloses a traction battery for a hybrid or electric vehicle, with a housing which surrounds a battery arrangement and at least one cooling device, wherein the battery arrangement comprises at least two battery modules, and the at least one cooling device is operated with a liquid coolant, wherein the housing is equipped with closed reinforcement profiles on a base plate which is attached virtually parallel to a floor panel of the vehicle. German laid-open application DE 10 2012 109 728 A1, which is incorporated by reference herein, discloses a battery temperature control device with a plurality of temperature control modules, for controlling the temperature of a battery, in particular a traction battery, wherein the temperature control modules are designed for arranging on outer surfaces of the battery.

SUMMARY

It is an object of the invention to improve an underbody of an electrically driven motor vehicle, with a vehicle supporting structure, which is bounded laterally in a transverse direction of the vehicle by two vehicle sills between which a multiplicity of battery modules is arranged, which battery modules are assigned a battery structure and at least one battery temperature control device, and with supply and/or removal devices for a temperature control medium, in particular functionally and/or with respect to the required construction space.

The object is achieved in the case of an underbody of an electrically driven motor vehicle, with a vehicle supporting structure, which is bounded laterally in a transverse direction of the vehicle by two vehicle sills between which a multiplicity of battery modules is arranged, which battery modules are assigned a battery structure and at least one battery temperature control device, and with supply and/or removal devices for a temperature control medium, in that the supply and/or removal devices for the temperature control medium are arranged in the region of the vehicle sills. A longitudinal direction of the motor vehicle is also referred to as the x direction. The vehicle transverse direction is perpendicular to the longitudinal direction and is also referred to as the y direction. A z direction runs perpendicular to a plane which is defined by the x direction and the y direction. The battery modules preferably serve for the production of a high voltage battery or a traction battery which serves, at least partially, for providing a driving power for the motor vehicle. The motor vehicle is preferably designed as a pure electric vehicle, but may also be designed as a hybrid vehicle which contains at least one further drive in addition to the electric drive. The high voltage battery or traction battery formed from the battery modules is also referred to as an underbody battery because of its arrangement in the underbody of the motor vehicle. Since the underbody battery has to be heated and/or preconditioned during the operation of the motor vehicle, the battery temperature control device is preferably a battery cooling device and/or a battery heating device. A cooling medium is then used as the temperature control medium. The cooling medium can be a cooling liquid, such as cooling water. The supply and/or removal device is also referred to as a distributing device or distributor for temperature control medium. The battery temperature control device can also be designed as a battery heating device, for example in order to preheat or precondition the underbody battery in the event of low outside temperatures.

A preferred exemplary embodiment of the underbody is characterized in that the supply and/or removal devices for the temperature control medium are arranged on outer longitudinal sides of a battery frame for the battery modules. The battery frame is part of the battery supporting structure. The battery frame preferably comprises at least one longitudinal profile which extends in the longitudinal direction of the vehicle and is arranged in the transverse direction of the vehicle between the battery modules and a vehicle sill. The supply and/or removal devices are, for example, lines or pipes which are arranged in an intermediate space between the battery frame and the vehicle sill. The arrangement according to aspects of the invention of the supply and removal devices permits a particularly flat structure of the underbody battery. Furthermore, an advantageous separation of the regions, in which the battery modules are arranged, from the regions, in which the temperature control medium, in particular a cooling fluid, is guided or distributed, is produced.

A further preferred exemplary embodiment of the underbody is characterized in that a supply or removal device for the temperature control medium is arranged in the transverse direction of the vehicle between the battery structure and one of the vehicle sills. This affords the advantage that no additional construction space is required in the z direction of the motor vehicle for the supply or removal device.

A further preferred exemplary embodiment of the underbody is characterized in that the supply or removal device for the temperature control medium is arranged below a connecting region which connects the battery supporting structure to the vehicle sill. The connecting region preferably comprises at least one longitudinal profile which connects the battery supporting structure, in particular the battery frame, to the vehicle sill. The longitudinal profile for producing the connecting region can be connected to further longitudinal profiles which serve for producing the vehicle sill or the battery frame. The connection is preferably designed as an integrally bonded connection. The integrally bonded connection is designed, for example, as a welded joint.

A further preferred exemplary embodiment of the underbody is characterized in that the supply or removal device for the temperature control medium is arranged in a connecting region which connects the battery supporting structure to the vehicle sill. A particularly stable or robust accommodation of the supply or removal device is thereby made possible in a simple manner. The connecting region can be produced, for example, by two longitudinal profiles which extend in the longitudinal direction of the vehicle and which are spaced apart from one another in the z direction. The supply or removal device can be accommodated neutrally in terms of construction space in the z direction in an intermediate space between the longitudinal profiles.

A further preferred exemplary embodiment of the underbody is characterized in that the battery supporting structure comprises a base structure and/or sealing structure which is arranged in a z-direction of the vehicle between a temperature control base structure and the battery modules. The temperature control base structure is designed, for example, as a temperature control plate with fluid passage channels. The base structure and/or sealing structure advantageously serves to avoid undesirable contact between the battery modules and the temperature control medium.

A further preferred exemplary embodiment of the underbody is characterized in that the temperature control base structure is arranged in the z direction of the vehicle between a base plate and the base structure and/or sealing structure of the battery supporting structure. The base plate advantageously serves to produce impact protection during the operation of the motor vehicle.

A further preferred exemplary embodiment of the underbody is characterized in that the temperature control medium is a temperature control liquid, in particular a cooling liquid. The supply and removal of the cooling liquid advantageously takes place between the battery frame and the vehicle sills.

The invention furthermore relates to a supply and/or removal device for a temperature control medium, to a battery supporting structure and/or to a connecting region for a previously described underbody. The parts mentioned can optionally be handled separated.

The invention also relates to a motor vehicle with a previously described underbody. The motor vehicle is preferably a purely electrically driven motor vehicle which is also referred to as an electric vehicle. However, the motor vehicle may also be a hybrid vehicle which, in addition to an electric drive, comprises at least one further drive, for example an internal combustion engine drive.

BRIEF DESCRIPTION OF THE DRAWINGS

Further advantages, features and details of the invention emerge from the description below in which various exemplary embodiments are described in detail with reference to the drawing, in which.

DETAILED DESCRIPTION

Figure 1:
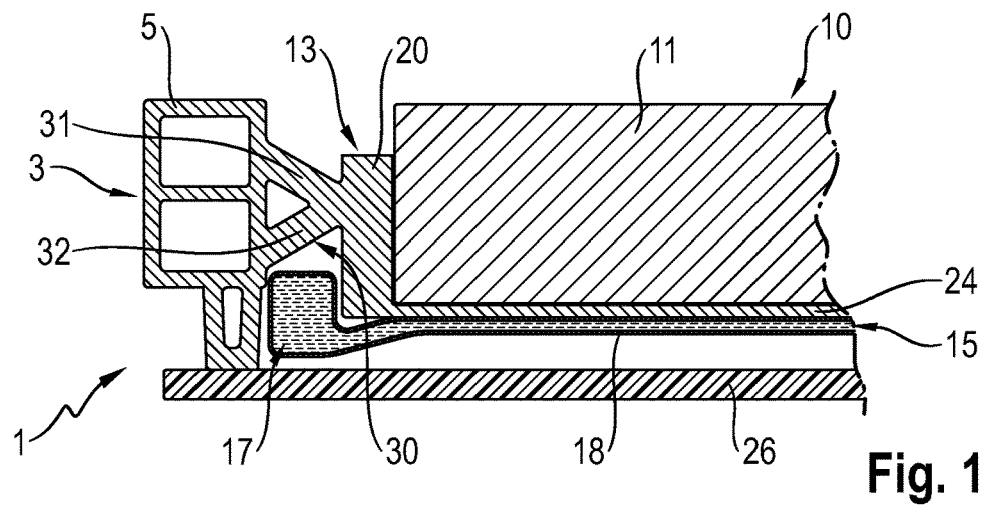
FIG. 1 shows the underbody of an electrically driven motor vehicle in cross section according to a first exemplary embodiment.
Figure 2:
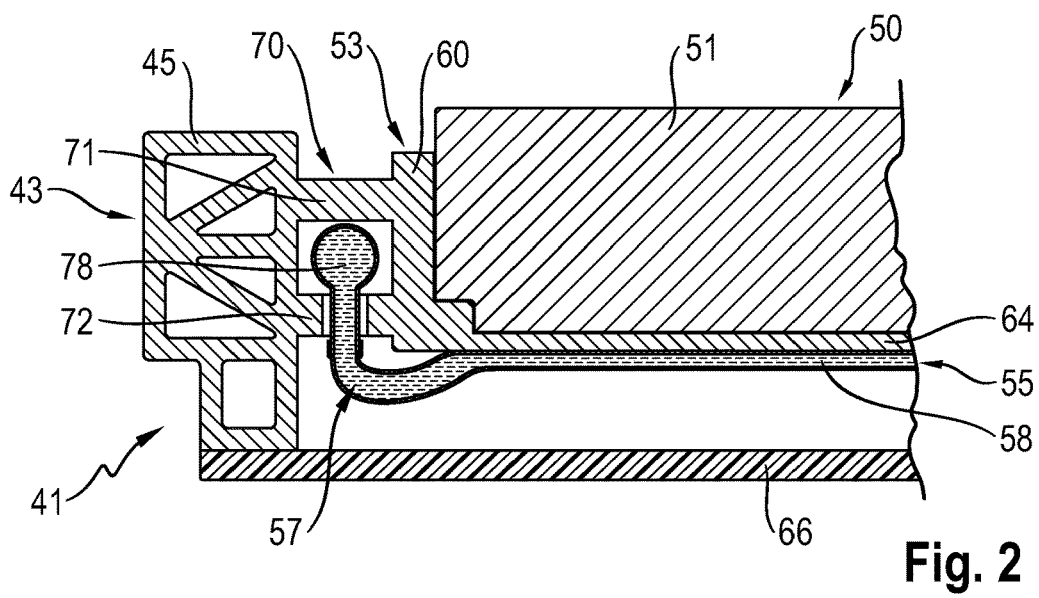
FIG. 2 shows a similar illustration as in FIG. 1 according to a second exemplary embodiment.

FIGS. 1 and 2 illustrate an underbody 1; 41 of a motor vehicle, with a vehicle supporting structure 3; 43 in cross section. The vehicle supporting structure 3; 43 is bounded in the transverse direction of the vehicle, i.e. to the left in the horizontal direction in FIGS. 1 and 2, by a vehicle sill 5; 45.

An underbody battery 10 with a multiplicity of battery modules 11 is substantially arranged between the left vehicle sill 5; 45 (shown in FIGS. 1 and 2) and a further right vehicle sill (not illustrated).

The underbody battery 10; 50 is assigned a battery supporting structure 13; 53 and a battery temperature control device 15; 55. The battery temperature control device 15; 55 is a cooling device which is operated with a cooling liquid. The cooling device 15; 55 operated with the cooling liquid serves to cool the battery modules 11; 51 which are heated during operation.

The temperature control medium, in particular the cooling liquid, is supplied via a supply device 17; 57 A removal device (not illustrated) for the temperature control medium, in particular for the cooling liquid, is advantageously assigned to the right vehicle sill (not illustrated).

The supply device 17; 57 is assigned to the left vehicle sill 5; 45 in FIGS. 1 and 2. The supply device 17; 57, possibly differently than illustrated, can be used both for supplying and for removing the temperature control medium, in particular the cooling liquid.

The cooling liquid is supplied to a temperature control base structure 18; 58 via the supply device 17; 57. The temperature control base structure 18; 58 is designed, for example, as a temperature control plate with a multiplicity of temperature control medium channels, in particular cooling liquid channels. The battery modules 11; 51 are effectively cooled via the temperature control base structure 18; 58 during operation of the motor vehicle with the underbody 1; 41.

The battery modules 11; 51 are arranged in a battery frame 20; 60 which is part of the battery supporting structure 13; 53. The battery supporting structure 13; 53 furthermore comprises a base structure and/or sealing structure 24; 64.

The base structure and/or sealing structure 24; 64 is arranged in the z direction between the temperature control base structure 18; 58 and the battery modules 11; 51.

A base plate 26; 66 bounds the underbody 1; 41 downward and produces impact protection. The base plate 26; 66 is fixedly connected to the vehicle sill 5; 45.

In FIG. 1, the supply device 17, which is also referred to as a distributor, in particular as a coolant distributor, is arranged in the z direction below a connecting region 30. The connecting region 30 comprises two longitudinal profiles 31, 32.

The two longitudinal profiles 31, 32 are connected to the battery frame 20, for example, in an integrally bonded manner. The two longitudinal profiles 31, 32 are advantageously connected at the ends thereof facing the vehicle sill 5 to the latter in an integrally bonded manner.

In FIG. 2, the supply device 57, which is also referred to as a coolant distributor, is arranged in a connecting region 70. The connecting region 70 comprises two longitudinal profiles 71, 72. The longitudinal profile 71 is arranged in the transverse direction of the vehicle between the battery frame 60 and the vehicle sill 45.

The supply device 57 is arranged in the z direction below the longitudinal profile 71 or between the two longitudinal profiles 71 and 72. The longitudinal profile 72 is likewise arranged in the transverse direction of the vehicle between the battery frame 60 and the vehicle sill 45.

Figure 3:
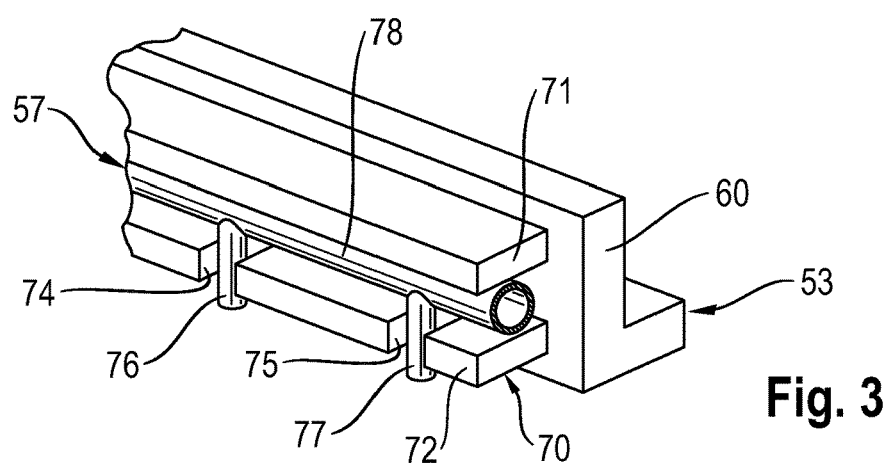
FIG. 3 shows a perspective illustration of a connecting region between a battery frame and a vehicle sill from FIG. 2.

It is seen in FIG. 3 that the lower longitudinal profile 72 has recesses 74, 75 through which connecting channels 76, 77, which emerge from a supply channel 78, extend.

The supply channel 78 of the supply device 57 runs in the longitudinal direction of the vehicle. The connecting channels 76, 77 provide a connection between the supply channel 78 and the temperature control base structure (58 in FIG. 2).

What is claimed is:

1. An underbody (1;41) of an electrically driven motor vehicle, comprising:
   a. a vehicle supporting structure (3;43), said vehicle supporting structure comprising two vehicle sills (5;45) located laterally in a transverse direction of the vehicle;
   b. a plurality of battery modules (11;51) arranged between the sills;
   c. a battery supporting structure (13;53) supporting the battery modules;
   d. at least one battery temperature control device (15;55) assigned to the battery modules, the battery temperature control device comprising a cooling device operated with a cooling liquid that cools the battery modules; and
   e. one or more supply and/or removal devices (17;57) for the cooling liquid, wherein the supply and/or removal devices (17;57) for the cooling liquid are arranged in the region of the vehicle sills (5;45).

2. The underbody as claimed in claim 1, wherein the supply and/or removal devices (17;57) for the temperature control medium are arranged on outer longitudinal sides of a battery frame (20;60) for the battery modules (11;51).

3. The underbody as claimed in claim 1, wherein the one or more supply and/or removal devices (17;57) for the temperature control medium are arranged in the transverse direction of the vehicle between the battery supporting structure (13;53) and one of the vehicle sills (5;45).

4. The underbody as claimed in claim 3, wherein the supply or removal device (17) for the temperature control medium is arranged below a connecting region (30) which connects the battery supporting structure (13) to the vehicle sill (5).

5. The underbody as claimed in claim 3, wherein the supply or removal device (57) for the temperature control medium is arranged in a connecting region (70) which connects the battery supporting structure (53) to the vehicle sill (45).

6. The underbody as claimed in claim 1, wherein the battery supporting structure (15;55) comprises a base structure and/or sealing structure (24;64) which is arranged in a z-direction of the vehicle between a temperature control base structure (18;58) and the battery modules (11;51).

7. The underbody as claimed in claim 6, wherein the temperature control base structure (18;58) is arranged in the z direction of the vehicle between a base plate (26;66) and the base structure and/or sealing structure (24;64) of the battery supporting structure (15;55).

8. A motor vehicle comprising an underbody (1; 41) as claimed in claim 1.

* * * * *